United States Patent [19]
Adolfsson et al.

[11] 4,433,238
[45] Feb. 21, 1984

[54] OPTICAL MEASUREMENT SYSTEM FOR SPECTRAL ANALYSIS

[75] Inventors: Morgan Adolfsson; Torgny Brogårdh; Sture Göransson; Christer Ovrén, all of Västerås, Sweden

[73] Assignee: Asea Aktiebolag, Västerås, Sweden

[21] Appl. No.: 312,750

[22] Filed: Oct. 19, 1981

[30] Foreign Application Priority Data

Oct. 21, 1980 [SE] Sweden ............................ 8007376

[51] Int. Cl.³ ............................................. G02B 5/14
[52] U.S. Cl. .................................. 250/227; 250/231 R
[58] Field of Search ................... 250/227, 226, 231 R; 350/96.15; 356/418

[56] References Cited

U.S. PATENT DOCUMENTS 4,338,516 7/1982 Sharma ........................... 250/231 R
4,376,890 3/1983 Engström et al. ................... 250/227

Primary Examiner—David C. Nelms
Assistant Examiner—J. J. Brophy
Attorney, Agent, or Firm—Watson, Cole, Grindle & Watson

[57] ABSTRACT

The invention relates to an optical measuring device for measuring physical or chemical quantities which device employs at least one light source, such as a light-emitting diode, in optical connection with a sensor, the spectral properties of which (e.g. the absorption or luminescence spectrum) are adapted to be changed by the quantity being measured, and at least one light detector (e.g. a photo-diode or a photo-transistor) for receiving the output signal from the sensor. The invention is characterized in that the measuring signal is adapted to be obtained by spectral analysis, and that this spectral analysis is adapted to be performed by varying the spectral distribution of the light source (the light-emitting diode) or maintaining said distribution constant, and/or by varying the sensitivity spectrum of the light detector or maintaining said spectrum constant, and that this control of the emission spectrum and the sensitivity spectrum is adapted to be carried out by a periodic controlling of the temperature of the light source and of the light detector, respectively.

20 Claims, 15 Drawing Figures

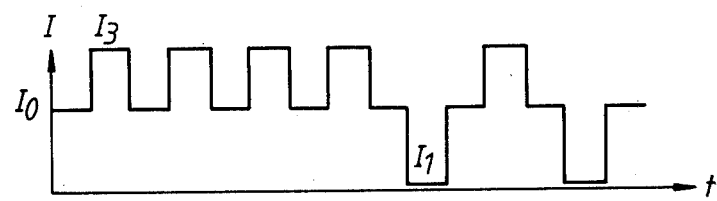
FIG.3c
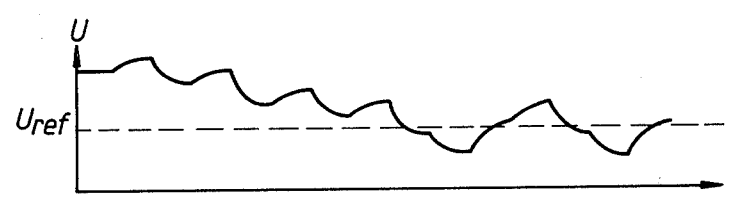
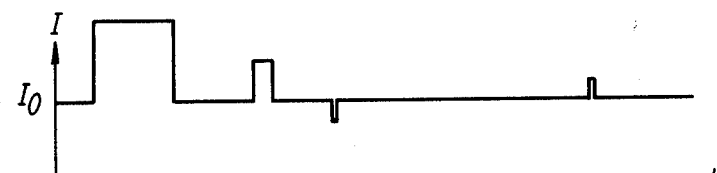
FIG.3d
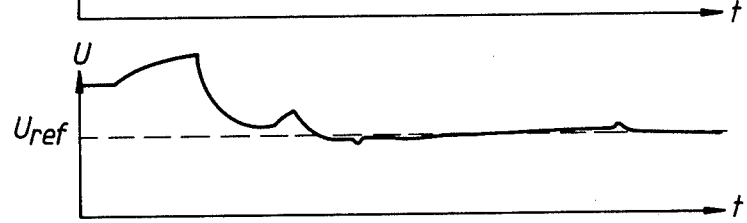
FIG.4
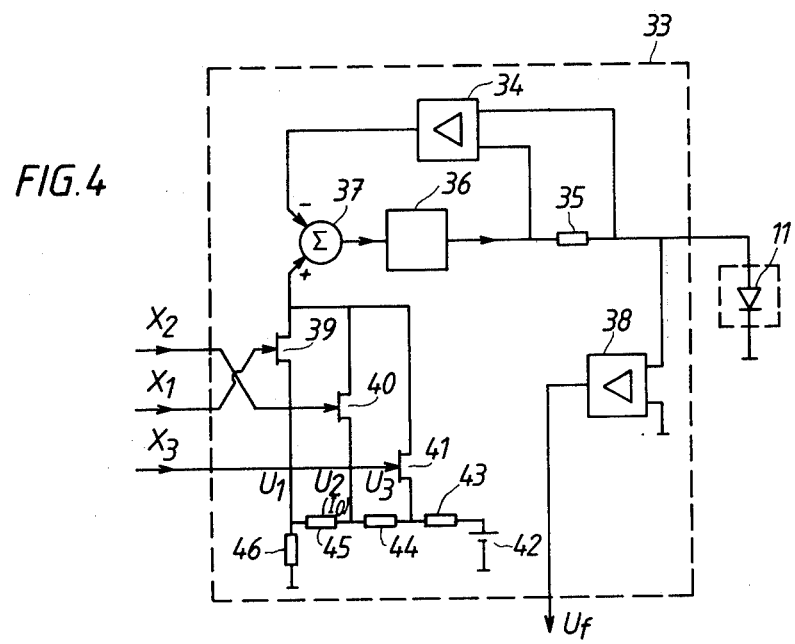

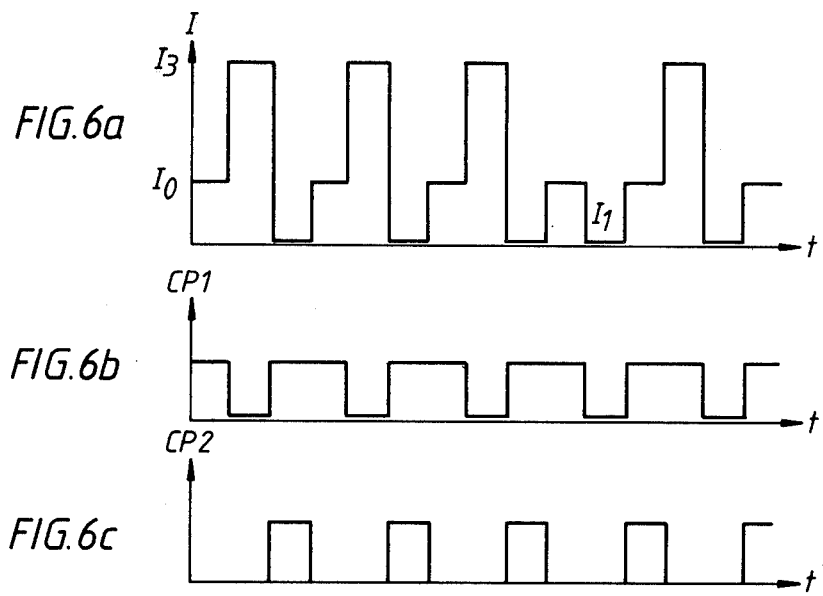
FIG.6a
FIG.6b
FIG.6c
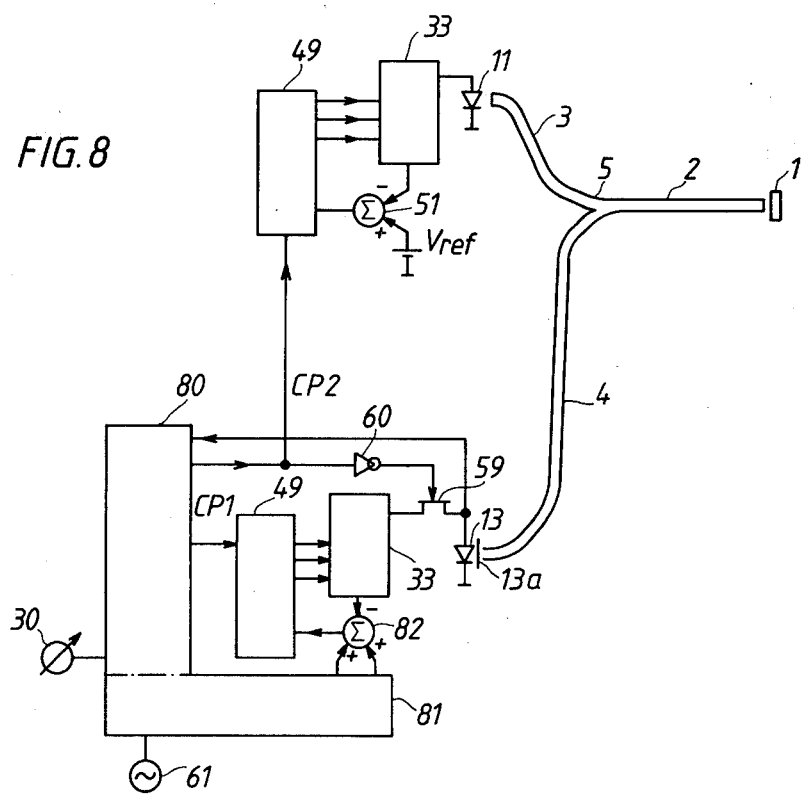
FIG.8

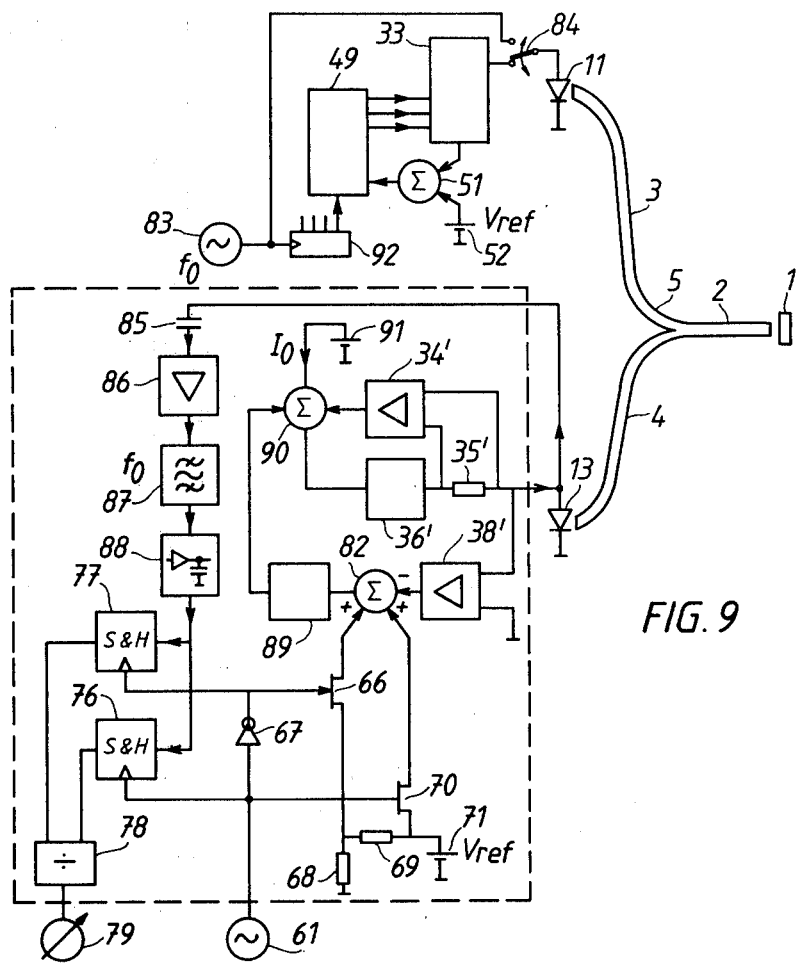
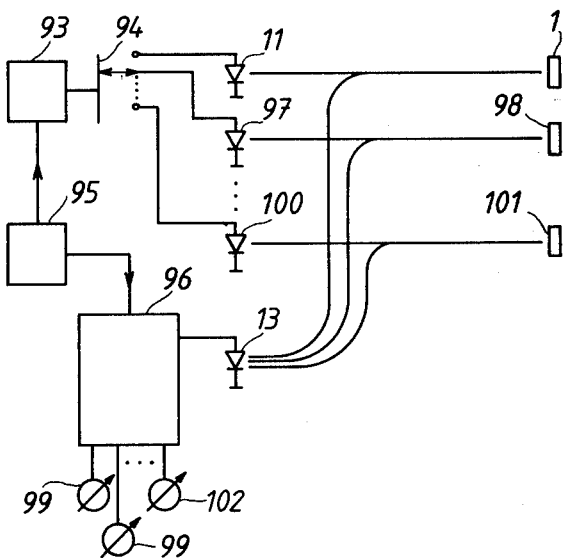
FIG. 9
FIG. 10

OPTICAL MEASUREMENT SYSTEM FOR SPECTRAL ANALYSIS

TECHNICAL FIELD

The present invention relates to an optical measuring device for measuring physical or chemical parameters with at least one light source, such as a light-emitting diode (LED), in optical connection with a sensor, the spectral properties of the output light of which (e.g. its absorption or luminescence spectrum) are adapted to be changed by the parameter to be measured, and at least one light detector (e.g. a photo-diode or a photo-transistor) for receiving the output light from the sensor.

The expression "light" which is used in this specification should be taken to include electromagnetic radiation within the UV range, the visible range, and the IR range.

When making measurements with optical sensors which have spectral properties which are influenced by the parameter to be measured, careful control of the emission spectrum of the light source(s) and the sensitivity spectrum of the photo-detector(s) is required, and this control may sometimes involve problems.

When measuring physical and chemical quantities by means of optical systems, changes of the spectral composition of the output light may adversely influence the measurement of the parameter being measured. To perform an accurate spectral analysis it is necessary for the spectral distribution of the emission of the light sources used and the sensitivity of the light detectors used to be carefully checked, and this often requires temperature stabilization of light sources, photo-detectors and associated optical filters by enclosing the same in temperature regulated enclosures.

The present invention aims to provide a solution to the above-mentioned problems and other problems associated therewith, and the invention is characterised in that the measuring signal is adapted to be obtained by spectral analysis, and that this spectral analysis is adapted to be performed by varying the spectral distribution of the light source (the LED) or maintaining said spectral distribution constant, and/or by varying the sensitivity spectrum of the light detector or maintaining said sensitivity spectrum constant, and that this control of the emission spectrum and the sensitivity spectrum, respectively, is adapted to be carried out by controlling the temperature of the light source and the light detector, respectively. The above-mentioned problems are thus solved in accordance with the invention by performing the temperature regulation in the components themselves without the need for a temperature-controlled enclosure. The variation of the emission and sensitivity spectra that is required for evaluating the measured value, can therefore be obtained by varying the temperatures of the light source and the photo-detector at intervals between parameter-measuring operations.

BRIEF DESCRIPTION OF DRAWINGS

The invention and the prior art will now be exemplified in greater detail with reference to the accompanying drawings, in which:

FIG. 3c shows the case where correction of the temperature is carried out after each parameter-measuring interval, FIG. 3d shows the case where an adaptive control of the light source current is being carried out, FIGS. 4 and 5 show block circuit diagrams for components of a device according to the invention operating with a fixed emission spectrum, FIGS. 6a, 6b and 6c illustrate pulses appearing in the device of FIG. 7, FIG. 8 shows a complete measurement device of the kind shown in FIG. 2, constructed from the blocks described with reference to FIGS. 3-7, FIG. 9 shows another measuring device of the same type as that shown in FIG. 2, where the measuring signals consist of an alternating signal of a certain frequency, and FIG. 10 shows a modified device employing multiplexing, where a plurality of sensors utilize the same electronic system.

DESCRIPTION OF PRIOR ART DEVICE

Figure 1:
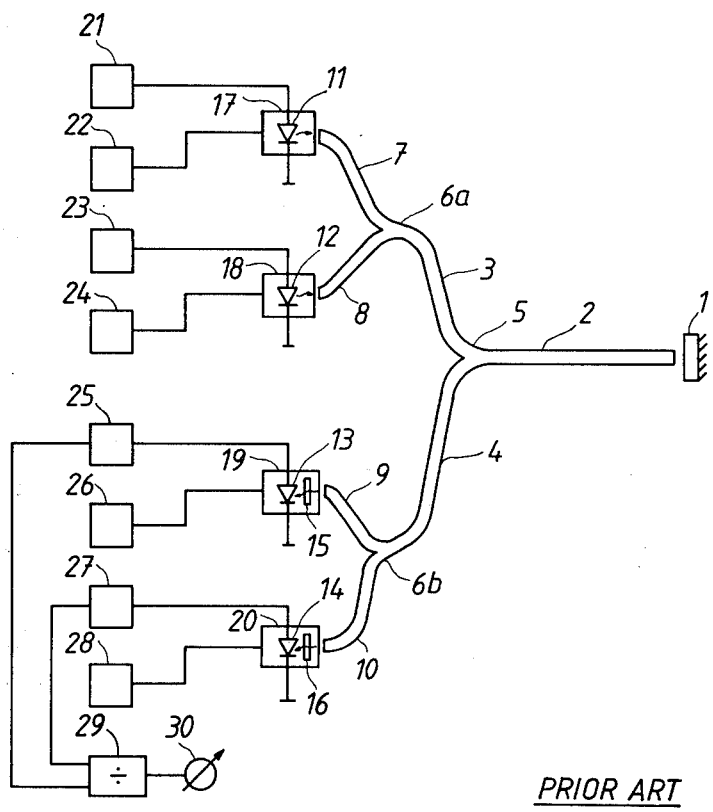
FIG. 1 is a block diagram of a typical fiber optical measuring arrangement, known from U.S. Pat. No. 4,281,245.

FIG. 1 shows a system according to a known technique (see U.S. Pat. No. 4,281,245) with a block diagram of a typical fiber optical measurement system operating on the basis of spectral analysis. The quantity to be measured, for example temperature, pressure or pH, influences the spectral properties, for example the absorption or lumineescence spectrum, of a sensor 1. Light is emitted from two separate LEDs 11 and 12 and is led, via light conductors 7, 8, 3 and 2, to the sensor 1. Light influenced by the sensor 1 is detected by photo-diodes 13 and 14 connected to the sensor 1 via light conductors 9, 10, 4 and the conductor 2. Light conductor branches 5, 6a and 6b are used to link together the light conductors.

To ensure that the emission spectra from the LEDs 11 and 12 are fixed with regard to wavelength, these LEDs are fed with constant current from current regulators 21 and 23, respectively, and each LED is maintained at a constant temperature by temperature regulators 22 and 24, respectively, which control the temperature in enclosures 17 and 18, respectively, in which the LEDs 11 and 12 are located. In a corresponding manner, the photo-diodes 13 and 14 with their associated optical filters 15 and 16, respectively, are maintained at a constant temperature by temperature regulators 26 and 28, respectively, which control the temperature in enclosures 19 and 20, respectively. Numerals 25 and 27 designate amplifiers which amplify the output signals from the photo-diodes and in the illustrated arrangement these are connected to an electronic quotient forming means 29 from which a measuring signal for an instrument 30 is obtained. One example of the use of a system such as that shown in FIG. 1 would be for temperature measurement of the sensor 1, and for this the temperature dependence of an absorption edge in the response spectrum of the sensor material would be analyzed. The LED 11 would then be used to emit light in the wavelength range in which the absorption edge is located, whereas the LED 12 would be used to emit light in a wavelength range which does not include that absorption edge. The filter 15 is used to filter reflected light coming from the LED 12, so the output signal from the photo-diode 13 is derived from the LED 11. In the same way the optical filter 16 is used to block reflected light from the LED 11. Thus, changes in the temperature of the sensor 1 will substantially only affect the output signal from the photo-diode 13, whereas the output signal from the photo-diode 14 constitutes a reference signal which is unaffected by changes in the temperature of the sensor 1. After quotient formation in the means 29, therefore, a measuring signal is obtained which has been compensated for any lack of stability in the light conductors.

The measurement system according to FIG. 1 is, however, relatively complex and requires accurate distribution of components, such as light conductor branches and temperature-regulated enclosures. At the same time, losses occur in the light conductor branches, which reduce the signal/noise ratio of the system.

With the present invention, the above-mentioned problems are drastically reduced by performing temperature regulation in the components themselves and by varying the emission and sensitivity spectra by varying the temperature of the light sources and the emitters, respectively.

DESCRIPTION OF PREFERRED EMBODIMENTS ACCORDING TO THE INVENTION

Figure 2:
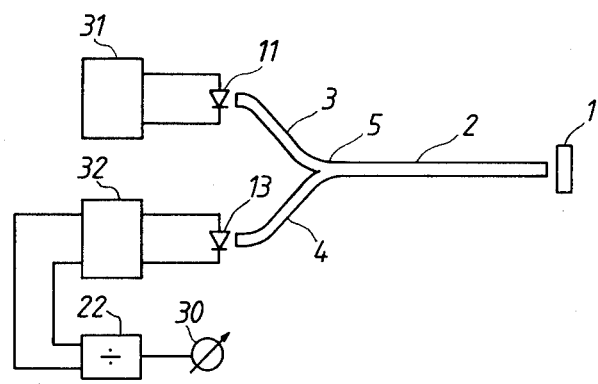
FIG. 2 represents a simple system according to the invention.

A simplified system according to the invention, is shown in FIG. 2. The LEDs 11 and 12 with their temperature-controlled enclosures 17 and 18, respectively, employed in the system of FIG. 1, have been replaced by one single internally temperature-controlled LED 11, and the photo-diodes 13 and 14 with their respective filters 15 and 16, and the temperature-controlled enclosures 19 and 20, have been replaced by one single internally temperature-controlled photo-diode 13 with an integrated band gap filter. At the same time, the light conductors 7, 8, 9 and 10 and the branches 6a and 6b are not required in the arrangement shown in FIG. 2. This simplification of the opto-electronic equipment required has been achieved at the expense of a more complex electronic system 31 and 32, which will be described hereafter. The invention applies to the case where a fixed emission spectrum from the LED 11 and a variable sensitivity spectrum for the photo-diode 13 are desired. However, it is also possible to have a variable emission spectrum and a fixed sensitivity spectrum or both a variable emission spectrum and a variable sensitivity spectrum. Each of these possibilities may be obtained in a simple manner by modifying the embodiment of device shown in FIG. 2.

In the case where it is desired to have the emission spectrum of the LED fixed in shape and colour, but where the intensity of the emitted light is not critical, the LED 11 may be temperature-stabilized by measuring the current I flowing through the diode and the voltage U appearing across the diode and regulating the current I so that $U/\ln I$ is maintained constant. Another method is to measure the temperature directly with a temperature sensor (e.g. a thermistor, a diode or a thermocouple) in good thermal contact with the LED, and to control the current through the LED so that the temperature is maintained constant. The LED may function as its own temperature sensor if, during certain intervals, its normal function is interrupted and a constant current is driven through the diode. The voltage drop across the LED then gives a measured value of the temperature which can be used to control the working current in such a way that the temperature of the LED is maintained constant.

Figure 3A:
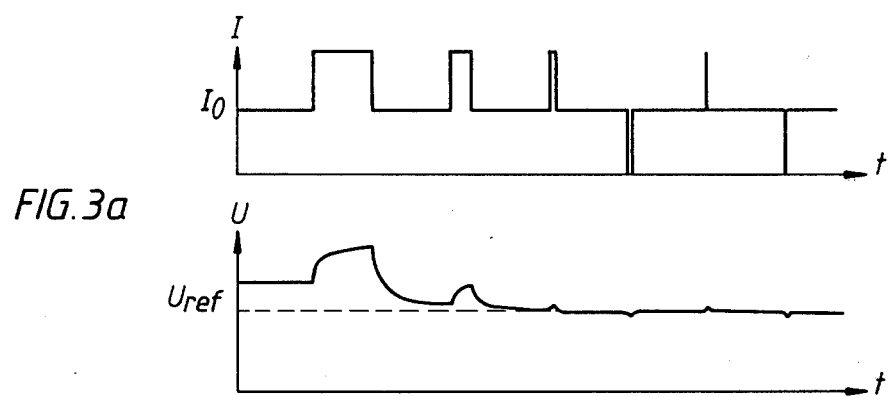
FIG. 3a shows curves of the current and voltage in a light source in a measuring device according to the invention where temperature correction is being carried out.

FIGS. 3a to 3d show curves of the current I through the LED and the voltage U across the LED plotted with respect to time t for four different temperature control methods which can be used when it is desired to have an emitted spectrum which is fixed with regard to the intensity as well as to shape and colour. Common to all four methods, is that the measuring process is divided, with respect to time, into two intervals. During one interval, normal working current $I_0$ is driven through the LED and the required measurement for parameter assessment is carried out by analyzing the light from the sensor 1, and at the same time the voltage across the LED is measured to provide a measure of its temperature. Depending on any deviations in the LED temperature, a correction of the temperature is made by adjusting the current through the LED relative to $I_0$, during the next interval. After this follows a new measuring interval with normal working current $I_0$. FIG. 3a shows the current and voltage curves for an arrangement in which temperature control is effected with current pulses of constant amplitude but of a duration which is controlled on the basis of the temperature deviation sensed during the immediately preceding measuring interval. The current pulses may be positive or negative in relation to the normal working current $I_0$ depending on whether the temperature sensed is lower or higher than its desired value.

Figure 3B:
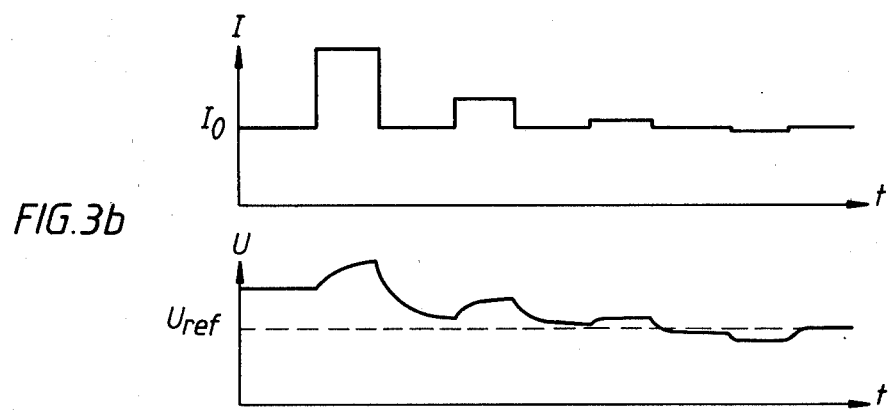
FIG. 3b shows the case where temperature correction is being carried out with current pulses of a constant length.

The curves in FIG. 3b shows an arrangement in which temperature control is effected with current pulses of a constant length but the amplitude of which is controlled by the temperature deviation sensed during the immediately preceding measuring interval. Depending on the sign of the sensed temperature deviation, the current pulses are positive or negative in relation to $I_0$.

FIG. 3c shows current and voltage curves for an arrangement in which temperature control is effected after each measuring interval by means of current pulses of a constant length and of a constant amplitude. The pulses are +'ve or −'ve in relation to $I_0$, depending on whether the sensed temperature is lower or higher than the desired value. The arrangement whose current and voltage curves are shown in FIG. 3d, employs an adaptive control of the LED current. After switching on, when the LED temperature deviates from its desired value, correction is made by means of current pulses with an energy content which depends on the sensed temperature deviation. In steady-state conditions, temperature-correcting pulses are supplied only when the voltage across the diode shows that its temperature deviates from the desired value by a predetermined value.

Figure 5:
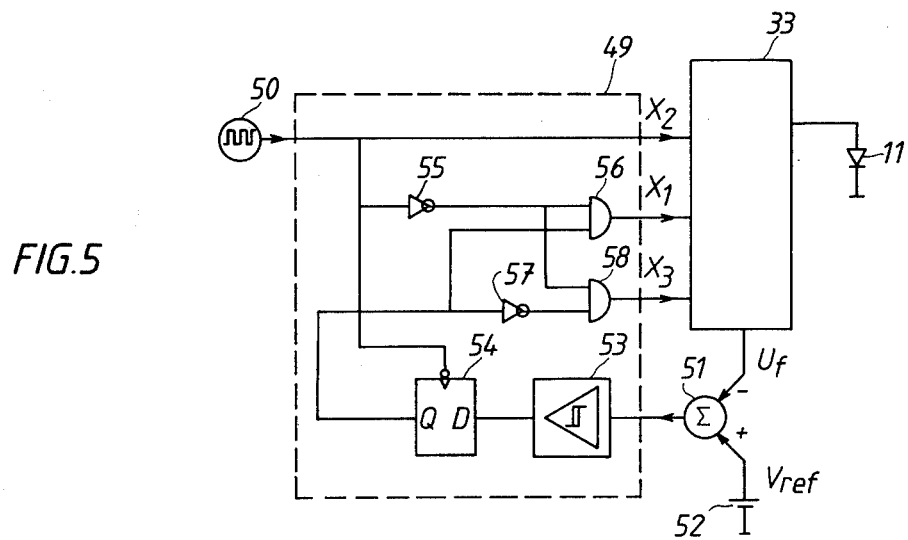

Two embodiments of control system capable of achieving a fixed emission spectrum from the LED 11 in FIG. 2 are shown in FIGS. 4 and 5. Each control system is of a type which gives current and voltage curves corresponding to the arrangement shown in FIG. 3c.

FIG. 4 shows an electronic circuit (within the dashed line rectangle 33) which consists of exciters for the LED current and circuits for the measurement of the LED current and voltage. A current generator 36 (with a built-in regulator) drives current through the LED 11 via a current shunt 35. The current through the LED 11 is measured by means of the shunt 35 and an amplifier 34. The current value is compared with the desired value in a comparing means 37, the output signal of which forms an input signal to the generator 36. Alternatively, temperature regulation on the basis of the light output of the LED 11 may be employed, the LED light then being analyzed in a suitable photo-diode. The desired value of the current is formed by reducing the output voltage from a voltage reference source 42 in a voltage divider consisting of resistors 43, 44, 45 and 46. From the different terminals on the voltage divider, voltages $U_1$, $U_2$ and $U_3$, corresponding to the currents $I_1$, $I_0$ and $I_3$ in FIG. 3c, may be switched in as required. The switching in is performed by switches 39, 40 and 41, respectively, which are controlled by input signals $X_1$, $X_2$ and $X_3$. The voltage $U_f$ appearing across the LED 11 is measured via an amplifier 38 and provides a measure of the temperature of the LED 11. In a device designed according to FIGS. 3c, 4 and 5, temperature measurement is performed only at the constant current $I_0$. Another alternative is to sense the LED temperature at an arbitrary current by correcting $U_f$ for the current which is employed during the temperature sensing.

FIG. 5 shows within the dashed line rectangle 49 an electronic circuit which controls the switch-over between the time intervals used for measurement of the parameter sensed by the sensor 1 and those used for temperature correction of the LED 11 and which also provides control signals for switching of the desired current value. A square wave oscillator 50 controls the length of the parameter-measuring and temperature-calibrating intervals. When the oscillator signal is "high" (i.e. it has a logic one) the control signal $X_2$ is "high", while at the same time the control signals $X_1$ and $X_3$ are maintained "low" through an inverter 55 and two AND gates 56 and 58. In this way, the desired value $U_2$, which gives the LED current $I_0$, is switched in. The voltage $U_f$ across the LED 11 is compared, in a comparison circuit 51, with the voltage $V_{ref}$ from a voltage reference source 52. The difference signal is passed to a comparator 53, the output signal of which is "high" when $U_f < V_{ref}$. The output signal from the comparator 53 is clocked in on a D-flip flop 54 by the oscillator signal becoming "low". A "low" oscillator signal causes the control signal $X_2$ to be maintained "low", while at the same time the signal path via the AND gates 56 and 58 is opened. Depending on the output signal from the flip flop 54, one of the signals $X_1$ or $X_3$ becomes "high" whereas the other is maintained "low" by an inverter 57 positioned in one of the branches. If the voltage drop across the LED 11, during the preceding measuring interval, was less than the reference value, that is, the LED was too hot, the output signal from the D-flip flop 54 will be "high" and the signal $X_1$ becomes "high" and $X_3$ "low". Thus the current $I_1$ is fed to the LED. If the voltage drop across the LED is greater than the desired value, $X_3$ becomes "high" and the current $I_3$ is fed to the LED.

An alternative embodiment is provided if the LED 11 is mounted, together with a separate heater, which may consist of a diode or a resistor in good thermal contact with the LED, possibly on the same semiconductor plate. A constant current $I_0$ is driven through the LED, and the voltage drop across the LED is used to control the current through the heater in such a way that the voltage across the LED, and thus its temperature, are maintained constant. Instead of a heater, a thermo-electric cooler may be used, the current to the cooler being controlled in such a way that the voltage drop across the LED, and therefore the temperature, is again maintained constant.

During temperature control of the photo-diode employed for reception of the light emitted from the sensor, the process can be divided into three intervals in the manner shown in FIG. 6a. The first interval is a temperature measurement interval, where a constant current $I_0$ is driven through the photo-diode while at the same time the voltage drop across it is measured and thus provides sensing of photo-diode temperature. During the next interval, the correction interval, a current ($I_3$ or $I_1$) is driven through the photo-diode, the actual current being dependent on the temperature sensed during the temperature measurement interval and provides a correction of the temperature of the photo-diode. The third interval is the parameter-measurement interval, when the photo-diode operates normally as a light detector. For temperature control of the photo-diode, the methods which have been proposed for temperature control of the LED may be used.

The photo-diode may also be provided with a separate heater in good thermal contact with the diode. The heater may be a resistor or a diode, possibly integrated on the same semiconductor plate as the photo-diode. It may also serve as a temperature sensor if it is a diode or a temperature-dependent resistor. One way of performing temperature stabilization is to run the heater diode in such a way that $U/\ln I$ is maintained constant.

Figure 7:
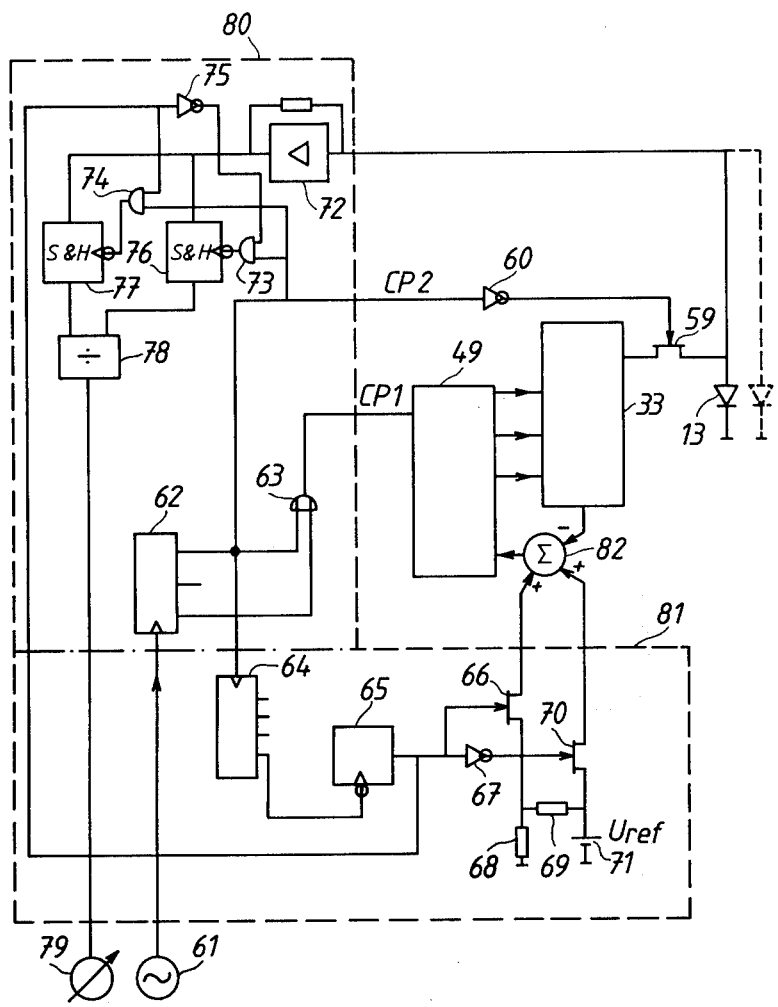
FIG. 7 is a block diagram of a receiver system in a device according to the invention, where analysis of the spectral distribution of the light is carried out.

One example of a receiver unit for employment in a measurement system which controls the temperature of the photo-diode 13 is shown in FIG. 7. The curve for the current through the photo-diode is shown in FIG. 6a as well as two clocking signals CP1 (FIG. 6b) and CP2 (FIG. 6c). From FIG. 6a it will be clear how the working process is divided into three intervals. During the temperature measurement interval, the current $I_0$ is driven through the photo-diode while at the same time temperature sensing is effected. Depending on whether the sensed temperature is greater than, or smaller than, the desired value, the current $I_1$ or $I_3$ is driven through the photo-diode during the correction interval. During the parameter-measurement interval, no current is driven through the diode, but the diode functions as a normal photo-diode.

FIG. 7 shows a receiver system in which analysis of the spectral distribution of the light emitted by the sensor 1 is carried out by shifting the spectral sensitivity of the photo-diode 13 by varying its working temperature. The effect is amplified if the photo-diode is provided with a filter with a temperature-dependent spectral sensitivity. The system illustrated in FIG. 7 consists of the electronic circuits 33 and 49 (shown in FIGS. 4 and 5, respectively) for control of the temperature of the diode 13, a circuit 81 which controls the shift between two working temperatures, and a circuit 80 which performs evaluation of the measuring signal. A clock signal is obtained from an oscillator 61 and is supplied to a three-stage ring counter 62, the outputs of which are decoded by an OR gate 63 which forms the clock signal CP1 shown in FIG. 6b. The signal CP1 gives order for a current $I_0$ to the circuit 49. The output from the third stage of the ring counter 62 is designated CP2 and is shown in FIG. 6c. The signal CP2 controls the disconnection of the temperature control circuits from the photo-diode 13 via an inverter 60 and a switch 59. The signal CP2 is also used to clock a counter 64 which changes the desired temperature value for the photo-diode 13 via a T-flip flop 65, an inverter 67 and two switches 66 and 70, respectively. The desired values are formed by a voltage reference source 71 and a voltage divider consisting of resistors 68 and 69. Evaluation of the parameter-measuring signal takes place by the photo-current from the diode 13 being amplified in an amplifier 72, the output signal of which is passed to two sample-and-hold circuits (S/H) 76 and 77. The reading into the S/H circuits is controlled by the output signal from the flip flop 65 via an inverter 75 and two AND circuits 73 and 74 so that the two S/H circuits acquire values corresponding to the two temperatures and thus to the two different spectral distributions of the sensitivity of the photo-diode 13. Via AND gates 73 and 74, the reading of the clock signal CP2 is controlled so that the reading takes place at the end of each parameter-measuring interval when the clock signals have been stabilized. The quotient between the output signals from the S/H circuits is formed in a division circuit 78, the output signal of which is passed to an instrument 79 which shows the measured value of the parameter.

Accurate signal evaluation with the receiver shown in FIG. 7 is based on the fact that variations in the transmission properties of the optical system are compensated for by quotient formation. Another way is to let the output from one S/H circuit control the amplification of a variable amplifier positioned before the S/H circuits so that the output signal of the S/H circuit is maintained constant. The output signal from the second S/H circuit then acts as the parameter measuring signal, which is corrected for variations in the optical transmission. In the receiver 32 in FIG. 2, two spectral sensitivities are maintained constant by temperature stabilization, the output signal being obtained by quotient formation. An alternative is to maintain one spectrum constant and control the other spectrum so that the quotient is maintained constant. The temperature, which provides the controlled spectrum, then constitutes the measured value and is obtained from the voltage appearing across the photo-diode.

FIG. 8 shows how a measuring system of the general type, shown in FIG. 2, may be built up with the components described with reference to FIGS. 3-7. From FIG. 8 it is clear that the synchronization of the circuits for the temperature stabilization of the LED 11 and the photo-diode 13, respectively, is performed by causing the clock pulse CP2 used for the photo-diode stabilization to act as a clock signal for the LED stabilization. The system according to FIG. 8 is based on the fact that the emission spectrum of the LED 11 is maintained fixed whereas the spectral sensitivity of the photo-diode 13 is changed between two values. An alternative embodiment is to change the emission spectrum and instead to maintain the spectral sensitivity of the LED constant. It is also possible to change both the emission spectrum of the LED and the spectral sensitivity of the photo-diode in order to achieve a higher sensitivity. FIG. 8 also shows a filter 13a acting in the same way as the filters 15 and 16 in FIG. 1.

FIG. 9 shows a further measuring device of the same general type as shown in FIG. 2, in which the measuring signal consists of an alternating signal of frequency $f_0$ and in which the temperature stabilization of the photo-diode is performed with a DC current. From a sine-wave oscillator 83 with the frequency $f_0$, a clocking signal, is obtained, via a frequency divider 92, and the clocking signal is supplied to the circuits employed for temperature stabilization of the LED 11. The temperature stabilization operates in the manner previously described with reference to FIG. 5. A switch 84 switches between temperature stabilization of the LED 11 and operation of the LED 11 with a sinusoidal current from the oscillator 83. The sinusoidal light from the LED 11 is modulated by the material of the sensor 1 and thus generates the parameter-measuring signal. On the receiver side, the measurement process is controlled by the oscillator 61, which changes the desired temperature value via the inverter 67 and the switches 66 and 70. The desired temperature value is obtained from the voltage reference source 71 and the voltage divider which is formed by the resistors 68 and 69. The desired temperature value is compared, in a comparison means 82, with the voltage appearing across the photo-diode 13, which is measured with an amplifier 38'. The difference signal from the comparison means 82 is supplied to a regulator 89, the output signal of which is passed to a comparison circuit 90, where the desired current value from a reference source 91 is compared with the actual current value, which is obtained via a current shunt 35' and a differential amplifier 34'. The output signal from the comparison circuit 90 provides an input signal to a circuit 36', which is a current generator combined with a regulator. The circuit 36' drives current through the photo-diode 13 in such a way that the voltage across the photo-diode, and therefore its temperature, has the desired value.

Superimposed on the DC current through the photo-diode 13 is a photo-generated alternating current which contains the signal information. The alternating signal is taken from the photo-diode 13 via a coupling capacitor 85 and an amplifier 86, and components of the frequency $f_0$ are separated out by a band pass filter 87. The output signal from the filter 87 passes through an envelope detector 88 and is read into either of the two S/H circuits 76 or 77, depending on which desired temperature value is switched in. After quotient formation in the division circuit 78, the output signals from the S/H circuits form the parameter-measuring signal fed to the instrument 79.

A system for multiplexing is shown in FIG. 10, where a plurality of sensors 1, 98 . . . 101 utilize the same electronic system. LEDs 11, 97 . . . 100 are connected in successive order into an electronic circuit 93 by way of a multiple-way switch 94. The circuit 93 includes circuits for temperature stabilization of the individual LEDs, and the operation of the circuit 93 is controlled by a control circuit 95. The circuit 95 also controls an evaluation circuit 96, which provides for temperature control of the single photo-diode 13 and evaluation of the different parameter-measuring signals from the different sensors are fed to respective instruments 79, 99 . . . 102. Since the electronic system is utilized for several sensors, the system cost per measuring channel becomes lower however with the disadvantage of longer measurement times.

In the embodiments discussed the light sources have all been regarded as LEDs. It is of course possible to use semiconductor lasers as well. Photo-transistors can be used as a replacement for photo-diodes, but in that case, the temperature of the light detector would be sensed by measuring the base emitter voltage drop.

The invention can be varied in many ways within the scope of the following claims.

What is claimed is:

1. An optical measuring device for measuring at least one parameter of an object at a given location, which device comprises:
    a source of incident light which incident light, during a parameter-measuring operation, has a given spectral distribution,
    a sensor adapted to be positioned at said given location and to emit output light when irradiated by said incident light, the spectral response of said output light to said incident light during a parameter-measuring operation being changed by a change in the parameter to be measured,
    a light detector adapted to generate an output measuring signal when irradiated, during a parameter-measuring operation, with said output light from said sensor,
    optical means for transmitting incident light to said sensor and transmitting output light from said sensor to said light detector, and
    electronic means for sensing and controlling the temperatures of the light source and the light detector in intervals when the parameter-measuring operation is discontinued.

2. A measuring device according to claim 1, wherein the light detector includes an optical filter in thermal contact with the detector, the transmission curve of which filter is temperature-dependent.

3. A measuring device according to claim 2, in which the light detector is a semiconductor photo-diode and the filter consists of a layer of a semiconductor material applied directly on the photo-diode.

4. A measuring device according to claim 1, in which said electronic means for control of the temperature of the light source and the light detector comprises means to measure a temperature-dependent parameter of the light source and the light detector, respectively, and to adjust the current flowing through the respective light source and light detector between the parameter-measuring intervals to maintain the light source and the light detector at the desired temperatures.

5. A measuring device according to claim 4, in which the electronic means controls the respective current (I) through the light source and the light detector in such a way that U/lnI, where U is the voltage across the respective device, is maintained equal to a desired value.

6. A measuring device according to claim 5, in which the electronic means is employed to modify the temperature of at least one of the light source and the light detector to facilitate spectral analysis of said output light.

7. A measuring device according to claim 1, 4 or 5, in which the electronic means is adapted to measure the temperature of the light source and the light detector, and further including means to adjust the measured temperatures thereof and to measure the spectral properties of the output light from the sensor in sequentially repeated time intervals.

8. A measuring device according to claim 1, 4 or 5, in which the electronic means effects the temperature adjustment of the light source and the light detector by generating current pulses fed to the respective device, the energy of which current pulses depends on the deviation between measured temperature and the desired value of the temperature of the respective device.

9. A measuring device according to claim 8, in which the electronic means is adapted to effect a temperature adjustment only when the difference between the actual and the desired value of the temperature of the light source or the light detector exceeds a certain level.

10. A measuring device according to claim 1, further comprising a separate temperature control device in thermal contact with the light source and the light detector, respectively.

11. A measuring device according to claim 4, further comprising means to control the current through at least one of the light source and the light detector in such a way that the temperature thereof coincides with the desired values.

12. A measuring device according to claim 10, in which means is provided to control the current through each said temperature control device such that the temperature of the light source and the light detector coincides with the respective desired value thereof.

13. A measuring device according to claim 1, wherein said electronic means further includes means to carry out a spectral analysis on the output light by effecting measurements in two non-identical wavelength ranges by maintaining the emission spectrum of the light source constant and changing the sensitivity spectrum of the light detector.

14. A measuring device according to claim 1, wherein said electronic means further includes means to carry out a spectral analysis on the output light by effecting measurements in two non-identical wavelength ranges by changing the emission spectrum of the light source and maintaining the sensitivity spectrum of the light detector constant.

15. A measuring device according to claim 1, wherein said electronic means further includes means to carry out a spectral analysis on the output light by effecting measurements in two non-identical wavelength ranges by changing both the emission spectrum of the light source and the sensitivity spectrum of the light detector.

16. A measuring device according to claim 13, 14 or 15 wherein said electronic means further includes means for generating an output measuring signal from the quotient of the measuring signals within each of said wavelength ranges.

17. A measuring device according to claim 13, 14 or 15 wherein said electronic means further includes a variable gain amplifier for maintaining a measuring signal output obtained from one of said wavelength ranges constant and means for generating an output measuring signal from the quotient of the measuring output signal generated from each of said wavelength ranges.

18. A measuring device according to claim 10, wherein said source of incident light includes a thermoelectric cooler to cool the light source to improve the regulating properties at a lower working temperature.

19. A measuring device according to claim 10, wherein said light detector further includes a thermoelectric cooler to cool the light detector to improve the regulating properties at a lower working temperature.

20. A measuring device according to claim 1, wherein said electronic means further includes means for generating currents of a different modulating frequency than the currents used in a parameter measuring operation for temperature stabilization of the light source and the light detector.

* * * * *